(12) United States Patent
Lee

(10) Patent No.: US 7,037,094 B1
(45) Date of Patent: May 2, 2006

(54) FOODSPREAD APPLICATOR

(76) Inventor: Randy Dennis Lee, 11645 SW. Longspur Ter., Beaverton, OR (US) 97007

( * ) Notice: Subject to any disclaimer, the term of this patent is extended or adjusted under 35 U.S.C. 154(b) by 259 days.

(21) Appl. No.: 10/419,639

(22) Filed: Apr. 21, 2003

(51) Int. Cl.
*A23G 3/28* (2006.01)

(52) U.S. Cl. .................. 425/12; 425/87; 425/190; 425/318; 222/327; 222/391; 401/176

(58) Field of Classification Search ............ 425/12, 425/87, 190, 318; 222/327, 391; 401/176
See application file for complete search history.

(56) References Cited

U.S. PATENT DOCUMENTS

| | | | |
|---|---|---|---|
| 1,097,465 A | 5/1914 | Pratt | |
| 1,213,655 A | 1/1917 | Keil | |
| 1,242,404 A | 10/1917 | Werner | |
| 1,253,917 A | 1/1918 | Wern | |
| 1,507,516 A | * 9/1924 | Richardson | 425/378.1 |
| 2,234,432 A | 3/1941 | Gallo | |
| 2,458,120 A | 1/1949 | Volpini | |
| 2,581,745 A | 1/1952 | Amorino et al. | |
| 2,634,692 A | * 4/1953 | Sherbondy | 425/172 |
| 2,884,877 A | 5/1959 | Nalbone et al. | |
| 2,980,247 A | 4/1961 | Giantomosso | |
| 3,162,884 A | 12/1964 | Bordwine et al. | |
| 3,178,076 A | 4/1965 | Kennedy | |
| D217,007 S | 3/1970 | Smith | |
| 3,920,156 A | 11/1975 | Hicks | |
| 4,544,083 A | 10/1985 | Schroeder | |
| 4,779,770 A | 10/1988 | Herold | |
| D298,599 S | 11/1988 | Rzeszut | |
| 4,966,537 A | * 10/1990 | Bowles et al. | 425/87 |
| 4,981,041 A | 1/1991 | Merkle | |
| 5,409,533 A | 4/1995 | Pretty | |
| 5,421,663 A | 6/1995 | Bravo | |
| 5,955,114 A | 9/1999 | Llanos | |

* cited by examiner

*Primary Examiner*—Joseph S. Del Sole
(74) *Attorney, Agent, or Firm*—Karen Dana Oster; Alan L. Edwards

(57) ABSTRACT

A foodspread applicator that stores, measures, and applies foodspreads of the present invention preferably includes a main body having a front end and a rear end, a body tip attached to the front end of the main body, and a rear body attached to the rear end of the main body. The main body is suitable for receiving a foodspread therein. At least one outlet is preferably defined in the body tip through which the foodspread may be extruded. The rear body has a rear body longitudinal axis that is substantially parallel to a main body longitudinal axis of the main body. A plunger is movably located within the main body and the rear body for forcing the foodspread from the main body through the at least one outlet. A lever is longitudinally, pivotably attached to the rear body, the lever having a range of motion defined by the front end and the rear end of the rear body. The lever has a resting position within the range of motion at an angle less than 45 degrees from the rear body longitudinal axis. A power transmission mechanism mechanically communicates manual input from the lever to the plunger.

20 Claims, 7 Drawing Sheets

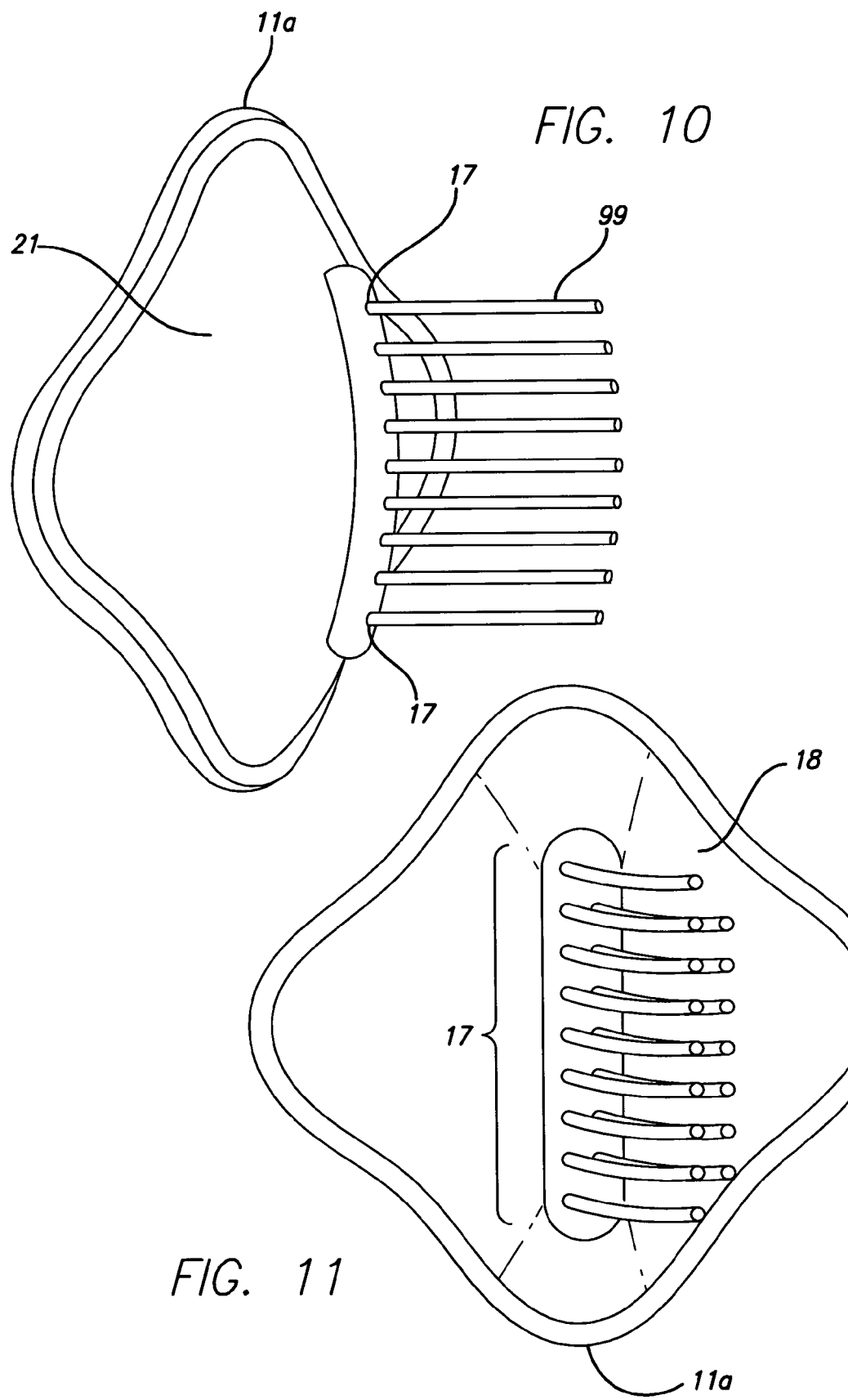

FOODSPREAD APPLICATOR

BACKGROUND OF INVENTION

The present invention relates to a device for storing and dispensing food products. More particularly, this invention relates to a kitchen implement that serves to store, dispense, and apply measured portions of foodspreads.

Foodspreads may include such spreadable substances as butter, cream cheese, jam, peanut butter, cake frosting, and any other spreadable or formable product. Although the term foodspread will be used throughout this disclosure to describe any spreadable substance, butter will be used as an exemplary foodspread.

Many people prefer the taste of butter to butter substitutes. However, butter is tedious and messy to use. For example, using butter traditionally involves retrieving a stick of butter in its dedicated butter dish from a refrigerator, retrieving a knife, slicing off a desired portion of the stick, placing the portion of butter on a food product, waiting for the butter to melt, attempting to spread the butter, returning the butter to the refrigerator, and finally disposing of the soiled knife.

Spreading cold butter is often difficult or impossible, particularly on soft breads, because cold butter is relatively solid. The alternative, and often required, step is to wait for the butter to melt on the desired surface before spreading is possible. Waiting is time-consuming and annoying. Slicing exactly the desired amount from a stick of cold butter can be difficult, as well. For the sake of convenience, many people slice off and use more than they actually desire. To overcome these problems, some people store butter at room temperature to soften it. This hastens spoilage and degrades the taste.

Many people use butter substitutes because they are more easily spreadable. A large number of those people would prefer to use butter were it more easy to use.

There is a long-felt need to improve the process of using butter. To address this need, numerous devices are described in the patent literature. Each of the devices has inadequacies that hinder its usefulness and acceptance in the marketplace. None has achieved widespread commercial usage. Some of the disadvantages of the prior art devices are outlined here.

U.S. Pat. No. 2,884,877 (1959) to Nalbone, describes a device for the purpose of spreading butter or the like. The Nalbone device includes a main body with a substantially perpendicularly attached combination stationary handle/lever. The Nalbone device has three disadvantages. First, a single discharge outlet is shaped such that it spreads butter in a single relatively thin layer of sufficient width to cover a slice of bread. This outlet profile severely restricts the manner and precision with which food or objects may be covered. For example, the described single outlet limits the user to apply accurately butter to bread or bread-shaped articles only. Second, a bottom surface of the Nalbone device's main body incorporates a shape that is designed to shear off and smooth the extruded butter. The shearing process of the Nalbone device does not cover odd-shaped surfaces accurately, and the smoothing function leaves the bottom of the device is a soiled state. Third, the stationary handle/lever are oriented largely perpendicular with the main body of the Nalbone device. The handle is used to hold and position the device, and the lever is used to actuate a piston within the main body. In this perpendicular orientation, the handle and the lever appear overly utilitarian for a kitchen aid or table utensil. Another disadvantage of the perpendicular orientation is that the device is needlessly complex and costly to manufacture. Still another disadvantage of the perpendicular handle/lever design is that the device is needlessly cumbersome and requires significant attentiveness and manual coordination to manipulate. Such diligence can make the Nalbone device hard to use for children and arthritic persons. Still another disadvantage of the perpendicular orientation is that this design makes the Nalbone device unable to fit in most refrigerators' butter storage compartments.

U.S. Pat. No. 5,955,114 (1999) to Llanos, discloses a device for extruding a stick of butter or the like. The Llanos device describes fundamentally the same handle and actuation member as the Nalbone device, with the same disadvantages. In addition, the Llanos device has a tip for extruding that is described as a rectangular nozzle. The shape of the Llanos tip generally distributes butter onto a surface in an unfinished manner. The butter must then be spread manually in a separate step. The additional spreading step is an inconvenience that makes the Llanos device time-consuming to use.

U.S. Pat. No. 3,920,156 (1975) to Hicks, describes a butter dispenser that has a different lever orientation then the Nalbone and Llanos dispensers. The Hicks lever is oriented parallel with the main body's longitudinal axis, but the lever is designed to be pulled away from the body. This lever design necessitates using both hands simultaneously. The need to use both hands on a device can be problematic for persons with one hand, or when a person needs to hold a receiving food or container. The Hicks device also has a non-extruding outlet that is intended to expose the unaltered stick of butter, that is then sliced and spread manually. The use of the Hicks device, with its outlet design, is as messy and time-consuming as the use of butter in a conventional manner.

U.S. Pat. No. 2,458,120 (1947) to Volpini, U.S. Pat. No. 4,981,041 (1991) to Merkle, and U.S. Pat. No. D217,007 (1970) to Smith each describe dispensers that have a plurality of outlets for the discharge of butter or food product. The dispensers described in these references rely on a manually-operated plunger to push out the butter. As cold butter is relatively hard and difficult to reshape, such manually-operated plungers would be almost impossible to operate easily. In addition, the two-dimensional, array-like, outlet configuration described in these references cause the discharged extrusions to overlap each other when applied in a typical manner. This overlapping tends to apply butter too densely and is wasteful and detrimental to diet control.

BRIEF SUMMARY OF THE INVENTION

There are many devices that attempt to alleviate the issues involved with the use of butter, but none has proved to be beneficial enough to become widely used. In order for a convenience device designed for kitchen use to achieve widespread commercial acceptance, and hence be useful, it is preferable that the device be cosmetically pleasing, ergonomic, efficient, and above all, functional. As will become evident, the present invention incorporates a number of improvements over prior art applicators into a single, convenient device, that makes butter significantly easier to use, and eliminates the spreading knife entirely.

A foodspread applicator that stores, measures, and applies foodspreads of the present invention preferably includes a main body having a front end and a rear end, a body tip attached to the front end of the main body, and a rear body attached to the rear end of the main body. The main body is suitable for receiving a foodspread therein. At least one outlet is preferably defined in the body tip through which the foodspread may be extruded. The rear body has a rear body longitudinal axis that is substantially parallel to a main body longitudinal axis of the main body. A plunger is movably located within the main body and the rear body for forcing the foodspread from the main body through the at least one outlet. A lever is longitudinally, pivotably attached to the rear body, the lever having a range of motion defined by the front end and the rear end of the rear body. The lever has a resting position within the range of motion at an angle less than 45 degrees from the rear body longitudinal axis. A power transmission mechanism mechanically communicates manual input from the lever to the plunger.

In one preferred embodiment, the applicator includes a filler tip that is removably attachable to the front end of the main body. The foodspread may be drawn into the main body by inserting a single, elongated orifice of the filler tip into foodspread and retracting the plunger.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 10 is a perspective view of a second exemplary embodiment of a body tip of the present invention having discharge outlets arranged in a single arc.

FIG. 11 is a front view of a third exemplary embodiment of a body tip of the present invention having discharge outlets arranged in a zig-zag.

DETAILED DESCRIPTION OF THE INVENTION

The present invention overcomes the disadvantages of the prior art and also includes new features. In separate preferred embodiments, the foodspread applicator of the present invention preferably includes one or more of the following objects and advantages. The first object is to provide a convenient and portable storage container for foodspread that retards spoilage. Specifically, the storage container is convenient because it is relatively compact and, in one preferred embodiment, can fit in a refrigerator's butter compartment. It is portable because it can be handled, used, and moved without danger of spillage. The storage container is preferably airtight so that it retards spoilage. The second object is to provide a foodspread applicator that dispenses and applies foodspread in a precise, efficient, and convenient manner onto food or into cooking receptacles, and eliminates the need for a separate spreading operation. This is accomplished by providing a foodspread applicator that has a plurality of discharge outlets through which foodspread is extruded and applied with precision. The third object is to provide a foodspread applicator that dispenses foodspread in measured quantities. This is accomplished by providing a means to predetermine the volume of contents extruded. The fourth object of the invention is to provide a convenient means to fill the foodspread applicator with a foodspread. This is accomplished by providing a filler tip with an elongated orifice, that is inserted into a container of foodspread. A plunger within the foodspread applicator is retracted, thereby drawing the foodspread into the foodspread applicator by suction. The filler tip may be conveniently washed separately.

Figure 1:
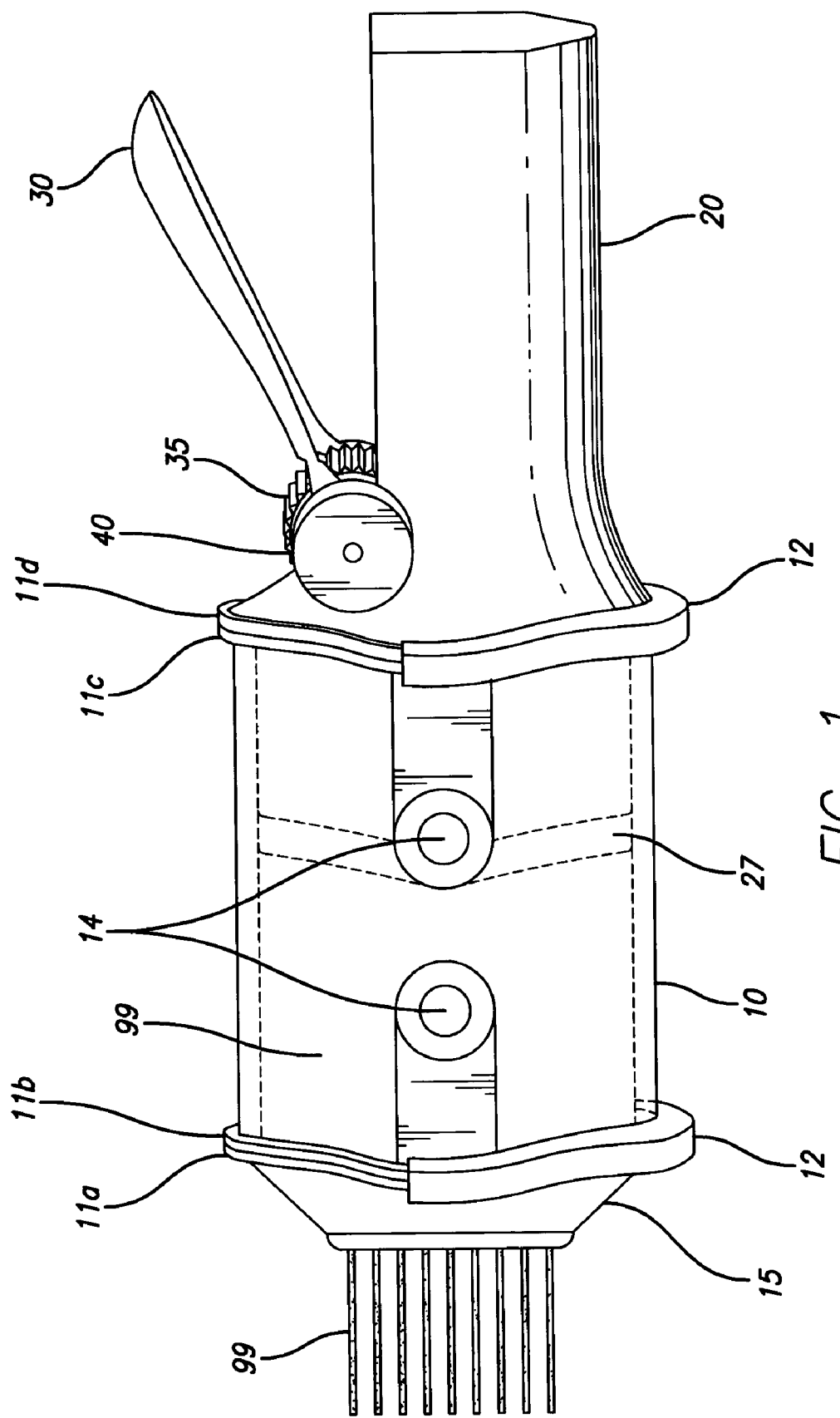
FIG. 1 is a side perspective view of an exemplary embodiment of a foodspread applicator of the present invention.
Figure 2:
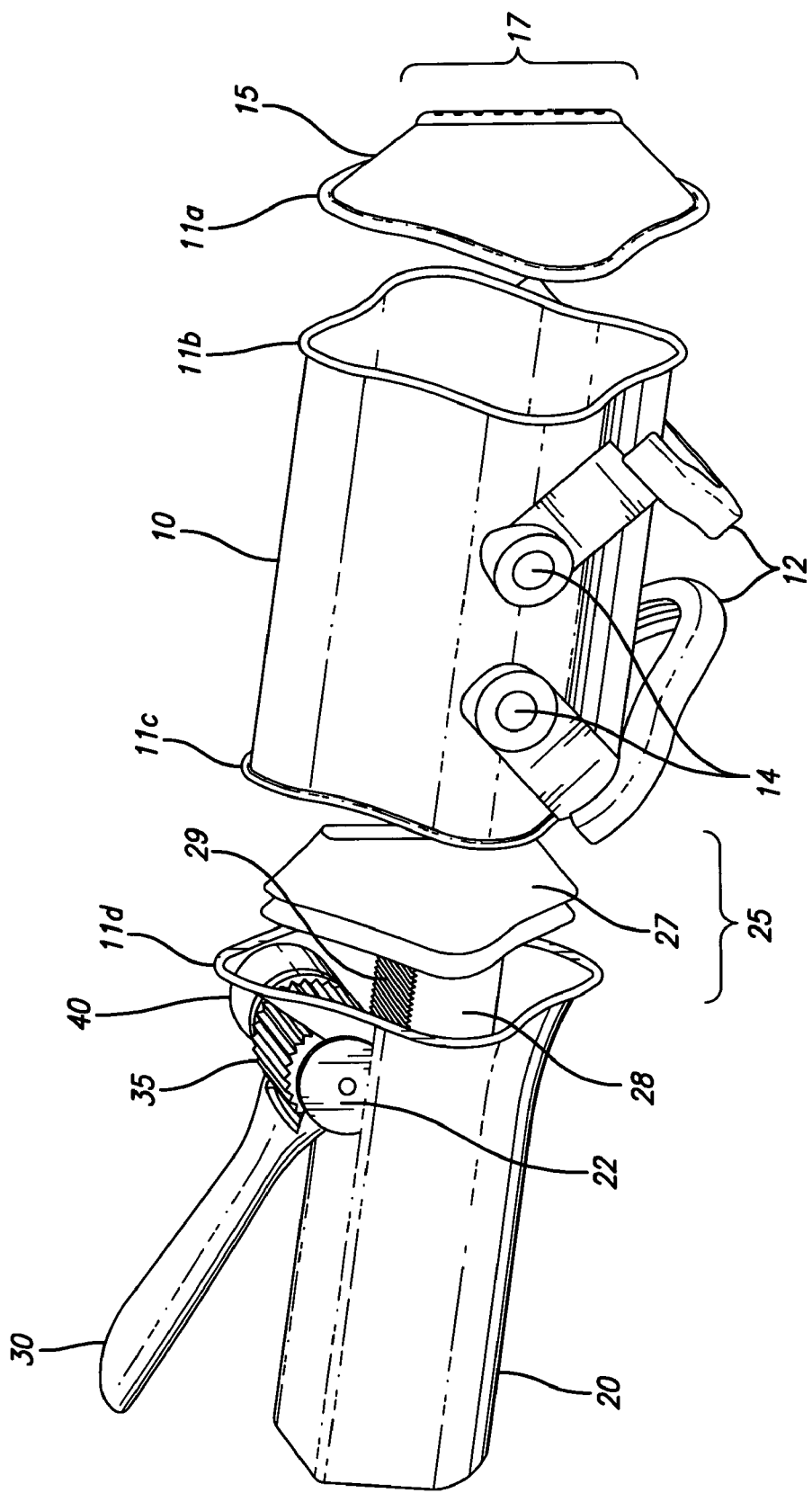
FIG. 2 is an exploded view of an exemplary foodspread applicator of the present invention.
Figure 5:
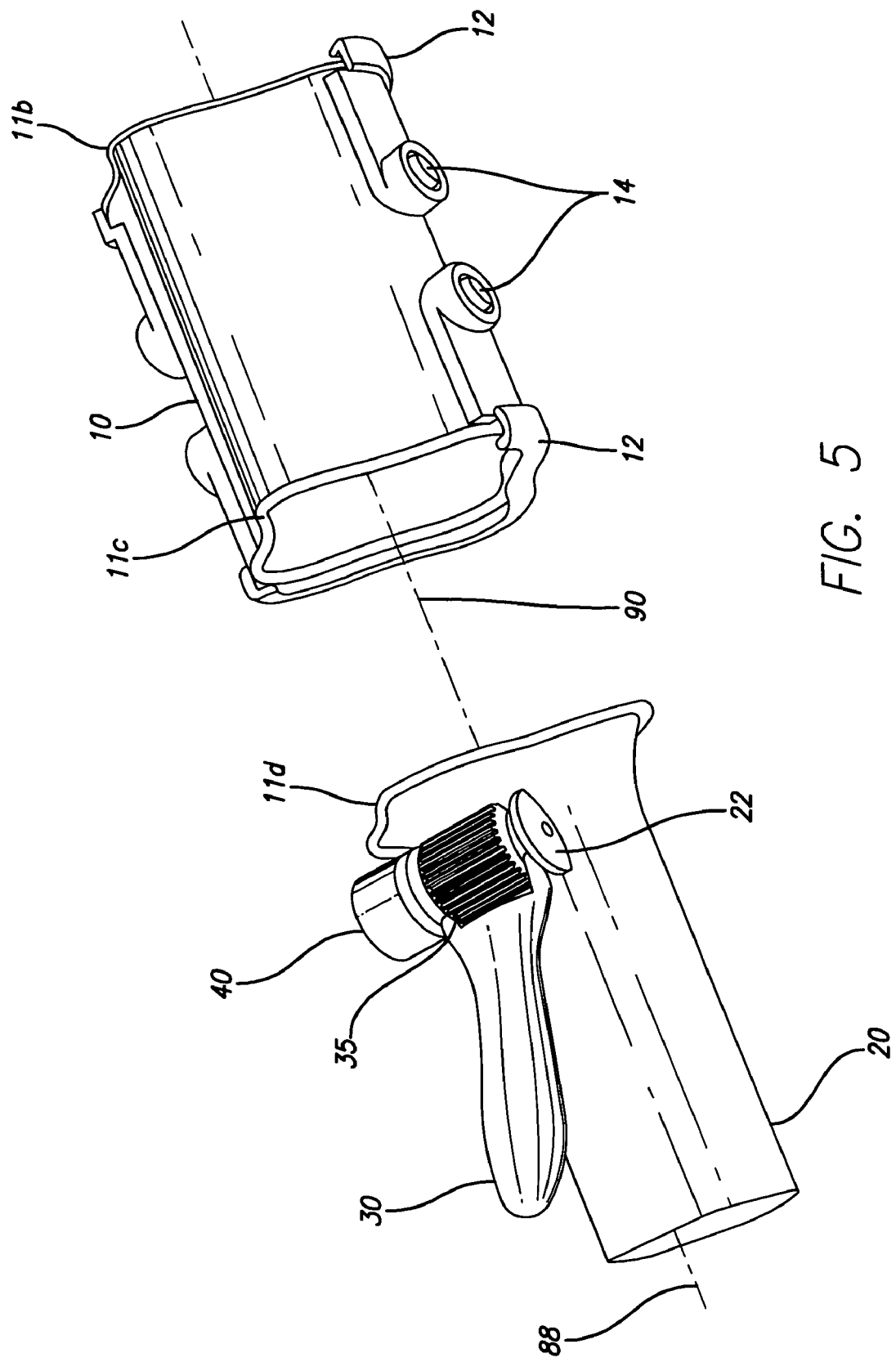
FIG. 5 is a perspective view of an exemplary main body section and an exemplary rear body section oriented generally about a single axis.

The present invention is a device for containing, measuring, dispensing, and applying foodspreads. As can be seen in FIGS. 1, 2, and 5, the entire foodspread applicator of the preferred embodiment is oriented generally about a single axis that may be made up of a main body longitudinal axis (90) and a substantially parallel rear body longitudinal axis (88). The shown exemplary embodiment includes three body sections including a main body (10), a discharge or body tip (15) at the front end of main body (10), and a rear body (20) at the back end of main body (10). Rear body (20) houses a piston or plunger assembly (25), a handle or lever (30), and a ratcheting gear assembly (35). The general configuration of the body sections of the preferred embodiment provide a relatively compact size that is able to fit in a refrigerator's butter compartment. The configuration further provides a shape that is ergonomic, cosmetically pleasing, requires minimal coordination to guide, and may typically have a relatively even weight distribution when the applicator is full.

Main body (10) is shown as an elongate, hollow structure of sufficient size and shape to accommodate a standard, one-quarter pound stick of butter. Main body (10) preferably has a substantially uniform internal cross-section shape throughout its length, that is shaped generally like a square with rounded corners and relatively inward-bent sides. This is best seen in FIGS. 2 and 5. The cross-section shape reduces trapped air, because when a new stick of butter is inserted and compressed, the profile of main body (10) leaves channels for air to escape before extrusion begins. It should be noted that the main body (10) shown in these figures is meant to be exemplary. For example, if the intended foodspread is to be a one-pound block of cream cheese, the dimensions would be adjusted appropriately. Similarly, for foodspreads without a predetermined shape, like peanut butter, the shape and size of main body (10) could be varied.

In one preferred embodiment, main body (10) is made of a material permitting visual determination of the positioning of plunger assembly (25). For example, main body (10) may be made of clear plastic or other suitable material. It should be noted that main body (10) may also be made of an opaque material with a clear window formed therein. Still other embodiments of main body (10) may be completely opaque.

Figure 8:
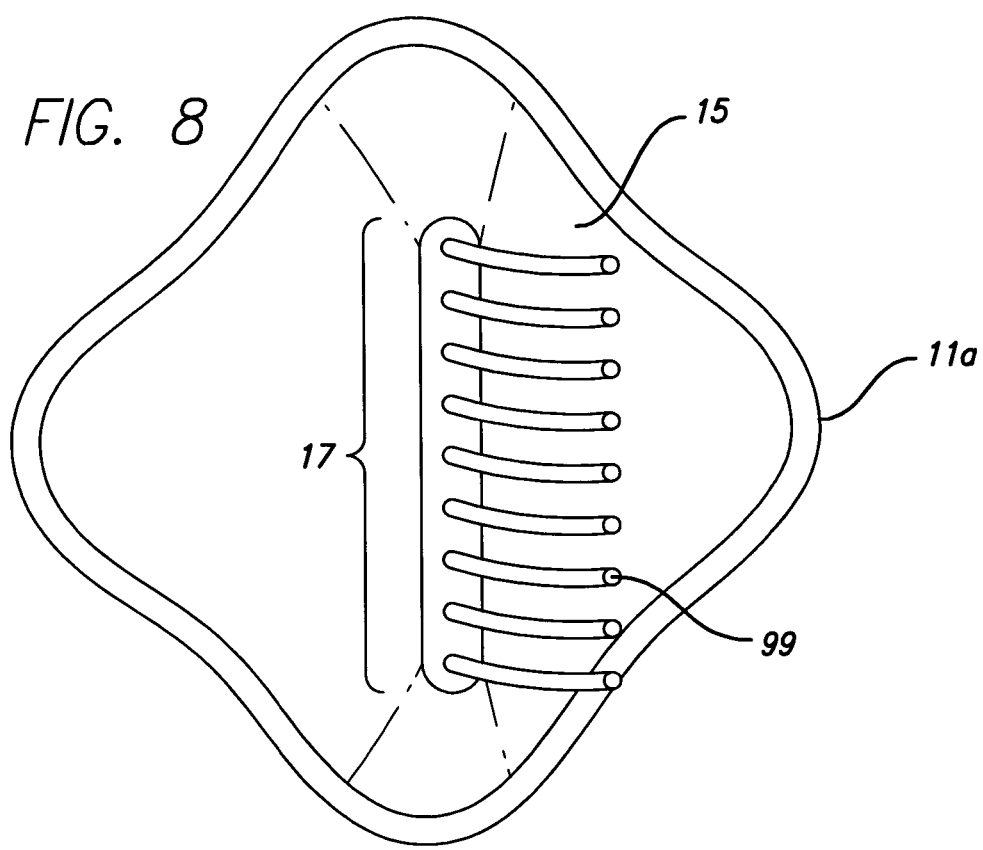
FIG. 8 is a front view of a first exemplary embodiment of a body tip of the present invention having discharge outlets arranged in a straight line.

The rear of body tip (15) is attached to the front end of main body (10), when the foodspread applicator is assembled. Referring now to FIGS. 2 and 8, one embodiment of body tip (15) is designed specifically for butter (99) and has a plurality of discharge outlets (17) through which the contents of main body (10) may be extruded. The plurality of discharge outlets (17) is shown as nine round holes, 2.0 mm in diameter, sequentially-spaced, defined substantially upon a straight line, and the total distance from first outlet to last outlet being 3.5 cm. Although the plurality of discharge outlets (17) is shown as nine holes, it should be noted that alternate embodiments may have more or less holes, for example, a few as four holes or as many as thirteen holes. Although the plurality of discharge outlets (17) is shown as round holes, it should be noted that alternate embodiments may have alternatively shaped holes, for example, oval, square, rectangular, slot-shaped, or star-shaped. Although the plurality of discharge outlets (17) is shown as having holes with a diameter of 2.0 mm, it should be noted that alternate embodiments may have holes with a diameter of between 1.5 mm and 3.5 mm, or smaller or larger holes for foodspreads of alternative consistencies or desired extrusion profiles. Although the plurality of discharge outlets (17) is shown as having holes arranged in a straight line and sequentially-spaced, it should be noted that alternate embodiments may have holes arranged in a single arc (21) (FIG. 10), a zig-zag (18) (FIG. 11), or alternative adjacent arrangements so long as the extrusions may be applied abreast of each other and do not overlap. Although the plurality of discharge outlets (17) is shown as having a total distance from first outlet to last outlet of 3.5 cm, it should be noted that alternate embodiments may have a total distance from first outlet to last outlet of between 2.5 cm to 5 cm, or smaller or larger, depending on the intended foodspread and receiving surface. The rear end of body tip (15) is preferably a complementary shape to the front end of main body (10) and tapers down to the shape of the plurality of discharge outlets (17). The overall length of the taper section is preferably as minimal as possible, to keep the foodspread applicator compact.

Figure 7:
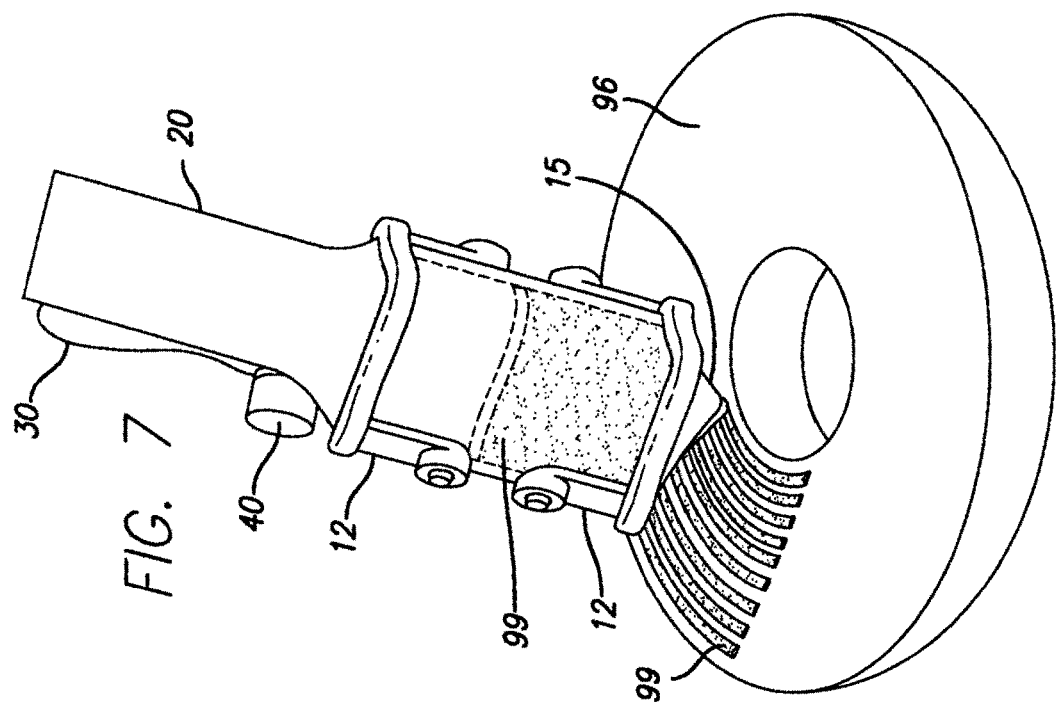
FIG. 7 is a perspective view of an exemplary foodspread applicator of the present invention applying a foodspread to a bagel half.
Figure 6:
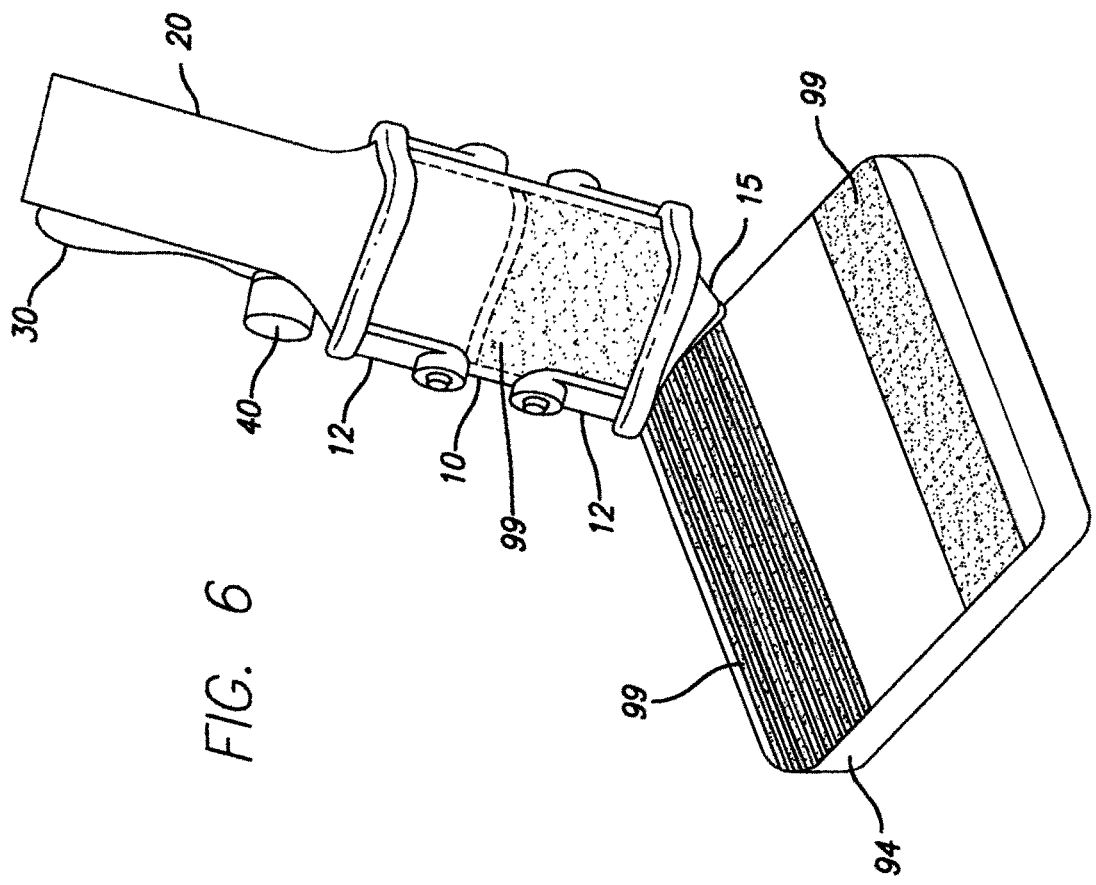
FIG. 6 is a perspective view of an exemplary foodspread applicator of the present invention applying a foodspread to a piece of bread.

As set forth above, the plurality of discharge outlets (17) shown in FIG. 8 are nine round holes, 2.0 mm in diameter, sequentially-spaced, defined substantially upon a straight line, and the total distance from first outlet to last outlet being 3.5 cm. For exemplary purposes only, this configuration will be discussed in terms of dispensing butter (99). This outlet profile extrudes butter into sequentially-spaced filaments, shaped like spaghetti. The outlet profile is an important feature that has numerous advantages. The extruded butter can be applied in a desirable amount and location, is easy to separate from the device, melts relatively quickly, and can have aesthetic and textural effects when applied to cold items. Furthermore, spacing the extrusions apart from each other provides a novel compromise of satiety and economy of consumption, because complete coverage of butter is not necessary for satisfactory butter taste. This economy of consumption can be particularly beneficially in diet control and cost savings. In contrast, prior art butter applicators tend to apply too much butter, or apply butter in an imprecise manner in which it is typically desirable to smooth and finish distributing the butter after application. One advantage of the straight-line arrangement is that the user can adjust the density of coverage to their liking by angling the discharge outlets in relation to the direction of the application stroke. For example, the user will angle the foodspread applicator of the present invention such that the extrusions are the maximum distance apart for minimum foodspread density, or the user will position the extrusions close together for more foodspread density. FIG. 6 shows the results of the two described application operations. Another advantage of having the outlets in a straight line is that the arrangement allows the user to apply more easily the butter in a non-linear manner, for example, when applying butter in a circular direction to a bagel half. FIG. 7 shows the application of foodspread to a bagel half. Still another advantage of the outlet profile of the present invention is that spreading the butter is generally not necessary. Eliminating the spreading step saves time and tedium. The relatively small, round holes also keep the exterior clean and prevent seepage or backflow of the contents, because cold butter (99) resists moving through small outlets. The contents are kept fresh, as well, because the small holes only expose a very small surface area of the foodspread to ambient air.

Figure 9:
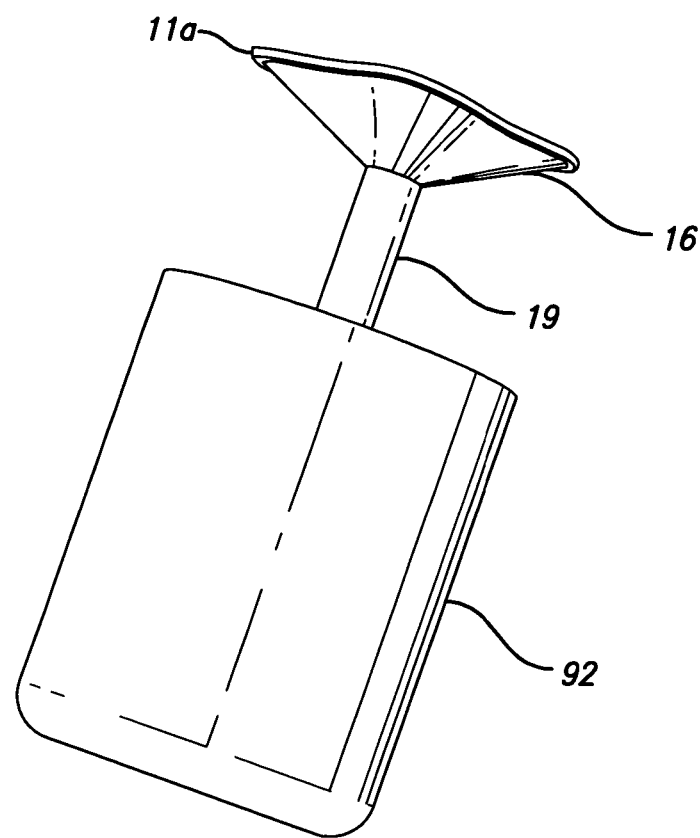
FIG. 9 is a perspective view of an exemplary embodiment of a body tip with an elongated orifice being inserted into a container of foodspread.

Referring now to FIG. 9, another embodiment of a body tip is designed to fill the foodspread applicator of the present invention with unpreshaped foodspreads such as peanut butter. Main body (10) may be filled with unpreshaped foodspreads using a filler tip (16). The shown filler tip (16) has a single, elongated orifice (19), preferably 6 mm or greater in diameter and greater than 8 cm long. However, the length and width of the orifice may vary substantially and still fall within the scope of the claimed invention. Filler tip (16) is used during the filling process (described below) to draw the contents of a container of unpreshaped foodspread (92) into the foodspread applicator by suction. Filler tip (16) may be removed and washed separately. The filler tip (16) simplifies the filling of the foodspread applicator of the present invention and eliminates the soiling of the main body.

Still another possible embodiment of a body tip (not shown), has a single, suitably shaped outlet for decorative extrusion of cake frosting, for example.

Referring now to FIGS. 1 and 2, attached to the back end of main body (10) is rear body (20). Initially positioned within rear body (20) is a piston or plunger assembly (25) that is able to be slidably located within rear body (20) and main body (10). Plunger assembly (25) is moved when the user actuates lever (30) that engages ratcheting gear assembly (35) that powers plunger assembly (25). The overall size and shape of rear body (20) is preferably kept modestly larger than is necessary to house plunger assembly (25) and small enough for users with small hands to grip around rear body (20) and lever (30) with one hand.

Figure 3:
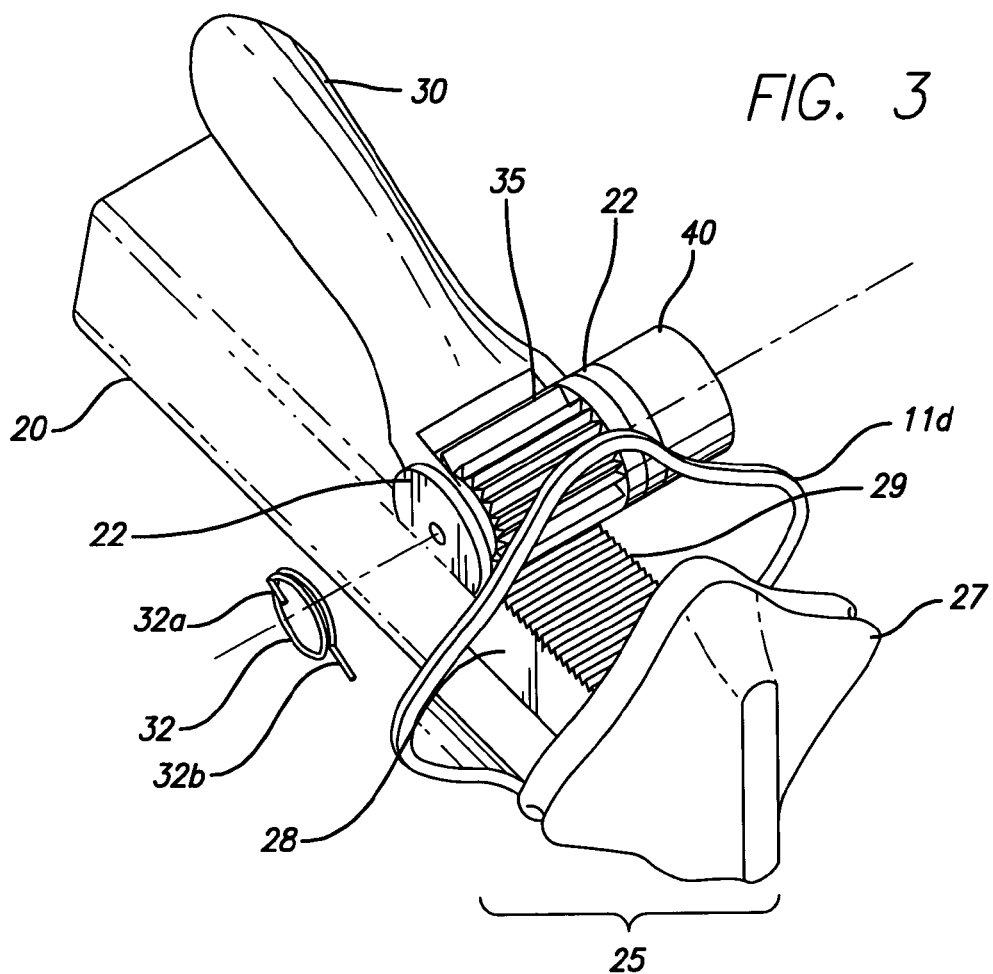
FIG. 3 is a perspective view of an exemplary rear portion of a foodspread applicator of the present invention, the rear portion including a plunger assembly partially advanced and a torsion spring beside its assembled position.

The interior of rear body (20) has guides (not shown) that slidably locate plunger assembly (25) within rear body (20) and main body (10). As can be seen in FIG. 3, plunger assembly (25) consists of a plunger head (27), an attached plunger shaft (28), and teeth (29) running along the shaft (28) length. Plunger shaft (28) may be an elongate, rectangular shape or of other suitable cross-section such that rotation is prevented. Plunger head (27) may be made of rubber or other suitable material. Furthermore, plunger head (27) is shaped to match the internal cross-section shape of main body (10), forms an airtight seal against, and is slidable within the interior of main body (10). Plunger head (27) also has a front shape that matches the interior (not shown) of body tip (15), so that minimal foodspread will remain in main body (10) and body tip (15) at the end of a service cycle. The general principal of form and function is similar to that of a medicinal syringe.

Rear body (20) has a pair of pivot supports (22) located proximally, through which a screw (not shown), or other suitable structure is centrally mounted therethrough. Lever (30), ratcheting gear assembly (35), and a control knob (40) are pivotably mounted to the pivot supports (22) using the screw.

Another improvement of the present invention over the prior art is the lever design. U.S. Pat. No. 5,955,114 to Llanos and U.S. Pat. No. 2,884,877 to Nalbone both describe devices with a stationary handle that opposes a pivotably attached lever. The handles and levers of the Llanos and Nalbone devices are oriented at a largely perpendicular angle with their main bodies. The shown preferred embodiment of the present invention eliminates the stationary handle entirely by having rear body (20) serve to oppose lever (30). The use of lever (30) without a separate handle simplifies the construction and cost of the foodspread applicator, makes the foodspread applicator easier to guide, improves the foodspread applicator's ergonomics, makes the foodspread applicator more aesthetically pleasing, and allows the foodspread applicator to fit in the butter compartment of a refrigerator.

Figure 4:
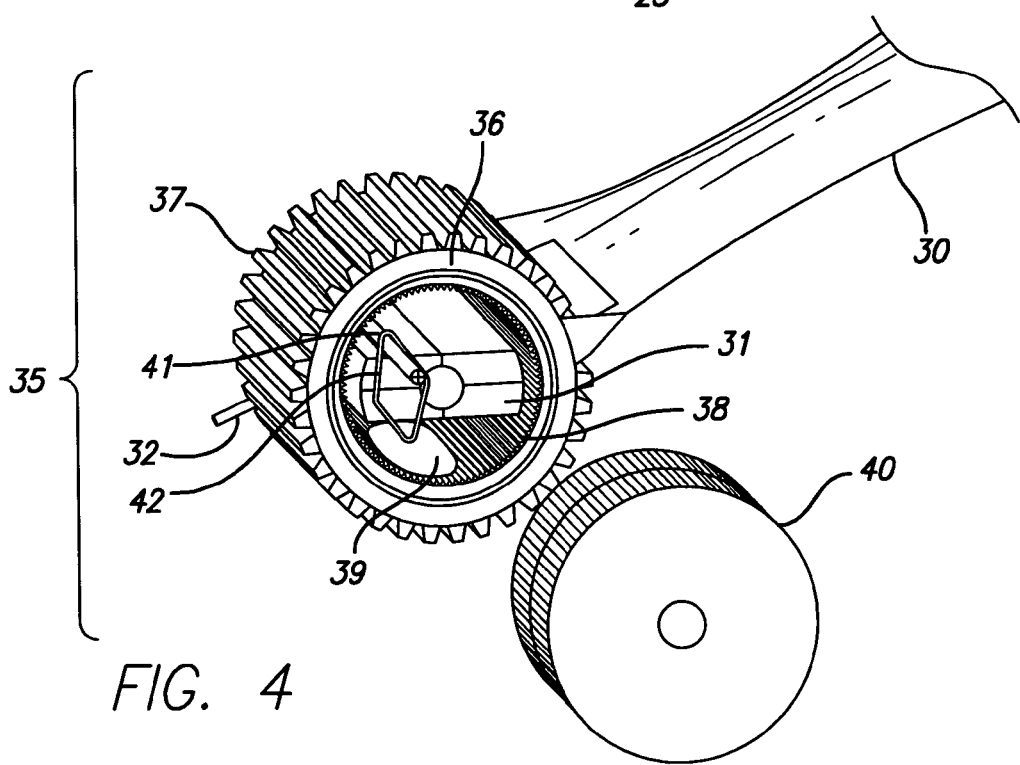
FIG. 4 is a detailed, perspective view of an exemplary lever, an exemplary ratcheting gear assembly, and an exemplary control knob of the present invention.

The general drive mechanism of the preferred embodiment will now be described with reference to FIGS. 3 and 4. The general drive mechanism may take many different forms; however, the preferred embodiment is shown as having lever (30) communicating manual input from a user through ratcheting gear assembly (35) to plunger assembly (25). Lever (30) is pivotably attached about the pivot supports (22) using a screw (not shown). Lever (30) further has a resting position that forms an acute angle (for example, between 20 and 40 degrees) with rear body longitudinal axis (88) of rear body (20) such that a user may squeeze lever (30) toward rear body (20) with one hand. To enable lever (30) to return to its resting position, a torsion spring (32) is coupled about drive lug (31) and is positioned adjacent to lever (30). A first end (32a) of torsion spring (32) engages lever (30) by interference, and a second end (32b) engages the interior of rear body (20), by interference. This lever and spring arrangement allows lever (30) to pivot longitudinally, from the back end to the front end of rear body (20), while being urged by torsion spring (32) into a resting position, facing rearwardly, of approximately 30 degrees with rear body longitudinal axis (88). This lever angle and spring arrangement has the benefit of measuring extruded volume, because the travel of lever (30) when resting against torsion spring (32) represents a predetermined volume of contents. For example, three squeezes of lever (30) may equal a tablespoon of foodspread. The ability to measure the volume of extruded foodspread is helpful for determining proper recipe amounts and diet control. Lever (30) also has an integrally formed drive lug (31) with flat top and bottom surfaces.

The shown ratcheting gear assembly (35) can mechanically advance or retract plunger assembly (25). The ratcheting gear assembly (35) may comprise: a ring gear (36) that has a set of coarse outer teeth (37) and a set of fine inner teeth (38), a double-acting pawl (39) that has fine teeth (not shown) for association with the fine inner teeth (38) of ring gear (36), and an extension spring (42). A control knob (40) has an attached pin (41). Extension spring (42) holds pin (41) and double-acting pawl (39) in fore or aft positions when control knob (40) is rotated in one direction or the other. This arrangement produces a two-way ratcheting action. Lever (30) extends around the side of and into the hollow of ring gear (36) and interconnects with drive lug (31). Drive lug (31) mechanically engages double-acting pawl (39) by interference, and double-acting pawl (39) ratchets about the fine inner teeth (38) of ring gear (36), in a known manner. Ring gear (36) mechanically communicates with plunger teeth (29). Whereby, manual power is communicated from lever (30) to drive lug (31) to double-acting pawl (39) to ring gear (36) to plunger assembly (25). The general drive mechanism of the present invention is a modified version of a common, hand-held, ratcheting-wrench design.

The means by which the body sections (including main body (10), body tip (15), and rear body (20)) of the shown embodiments are removably attached to each other will now be described with reference to FIGS. 1 and 2. In the preferred embodiment, main body (10) has an indent, notch, channel, or groove running along the circumference of each of its ends, facing distally (not shown). Body tip (15) and rear body (20) have raised projections, ribs, or tongues for association with and facing toward the grooves on main body (10) (not shown). In a known manner, the tongues mate with the associated grooves and serve to align the body sections during attachment, prevent leakage, and form a relatively airtight seal. A set of raised edges or flanges (11a, 11b, 11c, and 11d) help hold the body sections together in the shown embodiment. The flanges (11) are located where the body sections join, on the ends, adjacent to the tongues and grooves, and face perpendicular with the main body longitudinal axis (90). Main body (10) is shown as having a set of four mounting posts (14), located on the proximal outer surface, upon which a pair of latches or clasps (12) are pivotably mounted thereto. The clasps (12) run a little more than half the circumference of main body (10) and are suitably shaped to complement the flanges (11) and hold them together by interference. The mounting posts (14) are suitably positioned to allow the clasps (12) to rotate and engage the flanges (11), joining the body sections. The user may thereby rotate the clasps (12) out of engagement with the flanges (11) and pull the body sections apart to disassemble and clean the applicator, or vice-versa.

Operation

A typical service cycle of the exemplary foodspread applicator of the present invention will now be described.

To open the foodspread applicator, a user pivots the clasps (12) out of engagement with the flanges (11) and separates body tip (15) or rear body (20) from main body (10). Either body section works equally well. A stick of, for example, butter is dropped into main body (10), and then the foodspread applicator is reassembled in the reverse order. The foodspread applicator is set to the application mode by rotating control knob (40) a short distance clock-wise, for example. This sets the motor action of ratcheting gear assembly (35) such that it can advance plunger assembly (25). Lever (30) is squeezed repeatedly to advance the plunger assembly (25), until the butter conforms to main body (10) and the air is expelled. The foodspread applicator is now ready for normal use.

The foodspread applicator is typically operated by simultaneously squeezing lever (30) and moving the applicator over a surface. This operation produces extrusions of butter that may be deposited upon food or in containers of almost any shape as desired. Pans may be coated for cooking in this manner. The user may also adjust the density of coverage by spacing the extruded filaments of butter closer or farther apart by angling the plurality of discharge outlets (17) in differing manners. FIGS. 6 and 7 show the applicator applying a foodspread to bread products. Another feature of the foodspread applicator is that the foodspread can be simultaneously premeasured, added, and semi-mixed into cooking recipes, because the lever throw represents a predetermined volume of the foodspread.

Between uses, the foodspread applicator and its contents, may be placed in a refrigerator for fresh keeping. Successive operations can continue until the foodspread is exhausted. When the foodspread applicator needs refilling, the user can disassemble, clean, and then reuse it.

Referring now to FIG. 9, other foodspreads, such as peanut butter or jelly, can be conveniently used with the help of another embodiment of a body tip, filler tip (16). To do this, the user removes body tip (15), attaches filler tip (16), advances plunger assembly (25) fully, rotates control knob (40) counter-clockwise, places the elongated orifice (19) into the bottom of a food container, and then pivots lever (30) forward, repeatedly, away from rear body (20). This operation draws the foodspread into main body (10) by suction. The user continues until plunger assembly (25) is fully retracted and main body (10) is full. This approach to filling the foodspread applicator is much quicker and neater then scooping peanut butter into the foodspread applicator with a spoon. Then, the user reattaches body tip (15) and may wash filler tip (16) separately. The applicator can now be used as previously described.

Thus, the reader can appreciate how the features of the present invention are novel and distinguished from the prior art, and how the foodspread applicator can be practical enough to use every day.

ADDITIONAL EMBODIMENTS, CONCLUSION, RAMIFICATIONS, SCOPE

It should be noted that the term "foodspread" may include non-food spreadable or formable substances. For example, the present invention could be filled with PLAY-DOUGH® and used as a toy. Modified versions could be filled with glue or car wax.

Therefore, while the preceding discussion and description of the foodspread applicator contains many specifics, these are not intended to be construed as limitations on the scope of the invention, but rather as an exemplification of a preferred embodiment. Examples of possible alternative embodiments or modifications include, but are not limited to: the body sections and related components can be shaped, sized, or attached to one another differently; the general drive mechanism can take many different forms like: the foodspread applicator can be electro-mechanically powered, a more traditional toothed-rack and ratcheting-pawl design can be used in place of the ratcheting gear assembly, or the plunger shaft can be helically-threaded with associated structures.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A foodspread applicator that stores, measures, and applies mainly foodspreads, said applicator comprising:
    (a) a main body suitable for receiving a foodspread therein, said main body having a main body longitudinal axis, said main body having a rear end and a front end;
    (b) a rear body attached to said rear end of said main body, said rear body having a rear body longitudinal axis parallel to said main body longitudinal axis;
    (c) a body tip removably attachable to said front end of said main body;
    (d) at least one outlet defined in said body tip;
    (e) a plunger movably located entirely within said main body and said rear body;
    (f) a lever pivotably attached at an acute angle to said rear body longitudinal axis; and
    (g) a power transmission mechanism that mechanically communicates manual input from said lever to said plunger.

2. The applicator according to claim 1, wherein said main body is made wholly of a material permitting visual determination of the positioning of said plunger within said main body.

3. The applicator according to claim 1, wherein said main body is further defined as having a substantially uniform internal cross-section shape along said main body longitudinal axis, said cross-section is shaped generally like a square with round corners and relatively inward-bent sides.

4. The applicator according to claim 1, wherein said rear body and said body tip are further defined respectively having a front end and a rear end; flanges being located on;
    (a) said front end and said rear end of said main body,
    (b) said front end of said rear body, and
    (c) said rear end of said body tip;
        the applicator further comprising a pair of clasps pivotably connected to said main body at connection points spaced away from the flanges, the clasps configured to selectively engage said flanges, by interference, and hold said rear body and said body tip in attachment with said main body.

5. The applicator according to claim 1, wherein said at least one outlet comprises a plurality of outlets defined in a straight line.

6. The applicator according to claim 1, wherein said at least one outlet comprises a plurality of outlets defined in a single arc.

7. The applicator according to claim 1, wherein said at least one outlet comprises a plurality of outlets defined in a zig-zag pattern.

8. The applicator according to claim 1, wherein said at least one outlet comprises a plurality of outlets defined having sequential-spacing.

9. The applicator according to claim 1, further comprising:
    (a) a filler tip is removably attachable to said front end of said main body;
    (b) a single, substantially cylindrical, elongated orifice defined within said filler tip; and
    (c) wherein foodspread may be drawn into said main body when said filler tip is attached to said front end of said main body by inserting said single, elongated orifice into foodspread and retracting said plunger.

10. The applicator according to claim 1, wherein said power transmission mechanism comprises a ring gear, a double-acting pawl, and an extension spring.

11. A foodspread applicator that stores, measures, and applies foodspreads, said applicator comprising:
    (a) a main body suitable for receiving a foodspread therein, said main body having a main body longitudinal axis, said main body having a main body front end and a main body rear end;
    (b) a body tip attachable to said main body front end;
    (c) at least one outlet defined in said body tip;
    (d) a rear body attachable to said main body rear end, said rear body having a rear body longitudinal axis substantially parallel to said main body longitudinal axis, said rear body having a rear body front end and a rear body rear end;

(e) a plunger movably located entirely within said main body and said rear body;

(f) a lever longitudinally, pivotably attached to said rear body, said lever having a range of motion defined by said rear body front end and said rear body rear end, said lever having a resting position within said range of motion at an angle less than 45 degrees from said rear body longitudinal axis; and (g) a power transmission mechanism that mechanically communicates manual input from said lever to said plunger.

12. The applicator according to claim 11, wherein said rear body is removably attachable to said main body rear end, and further comprising a first flange disposed at the rear end of the main body, a second flange disposed at the front end of the rear body, and a latch pivotally attached on the main body, the pivotal attachment point disposed away from the first and second flanges, the latch configured to urge the first and second flanges into engagement.

13. The applicator according to claim 11, further comprising:
   (a) a filler tip removably attachable to said main body front end;
   (b) a single, substantially cylindrical, elongated orifice at least 5 mm in diameter and at least 4 cm long defined within said filler tip.

14. The applicator according to claim 11, wherein said at least one outlet is further defined being a plurality and defined in a straight line.

15. The applicator according to claim 11, wherein said at least one outlet is further defined being a plurality and defined in a single arc.

16. The applicator according to claim 11, wherein said at least one outlet is further defined being a plurality and defined in a zig-zag pattern.

17. The applicator according to claim 11, wherein said at least one outlet is further defined being a plurality and having sequential-spacing.

18. The applicator according to claim 11, wherein said at least one outlet is further defined being a plurality of sequentially-spaced outlets.

19. The applicator according to claim 11, wherein said power transmission mechanism comprises a ring gear, a double-acting pawl, and an extension spring.

20. A foodspread applicator that stores, measures, and applies foodspreads, said applicator comprising:
   (a) a main body suitable for receiving a foodspread therein, said main body having a main body longitudinal axis, said main body having a main body front end and a main body rear end;
   (b) a body tip attached to said main body front end;
   (c) at least one outlet defined in said body tip;
   (d) a rear body attached to said main body rear end, said rear body having a rear body longitudinal axis substantially parallel to said main body longitudinal axis;
   (e) a plunger movably located entirely within said main body and said rear body;
   (f) a lever movably attached to said rear body, said lever having a resting position at an angle less than 85 degrees from said rear body longitudinal axis, the lever positioned adjacent to said rear body at any of a plurality of acute angular positions relative to said rear body; and
   (g) a power transmission mechanism that mechanically communicates manual input from said lever to said plunger.

* * * * *